Jan. 30, 1945.　　　F. H. TABER　　　2,368,172
APPARATUS FOR APPLYING WEARING SURFACE COATINGS TO TIRES
Filed Dec. 18, 1942
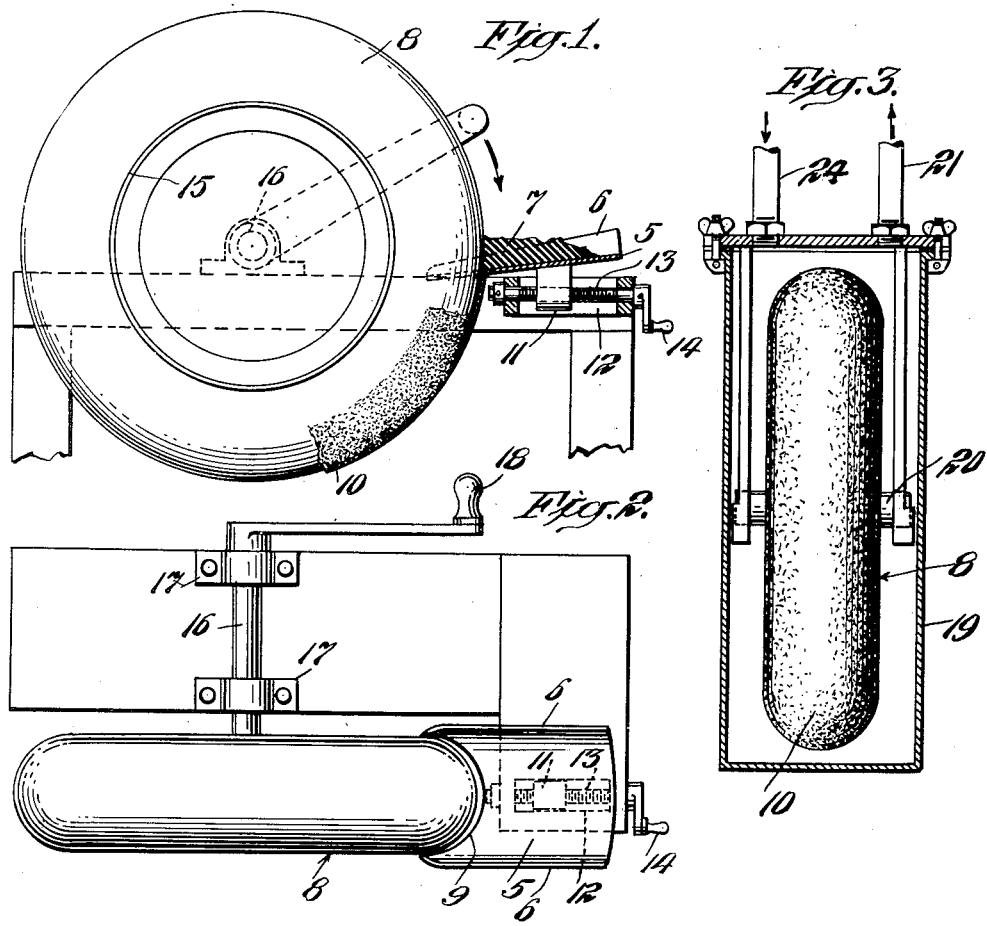
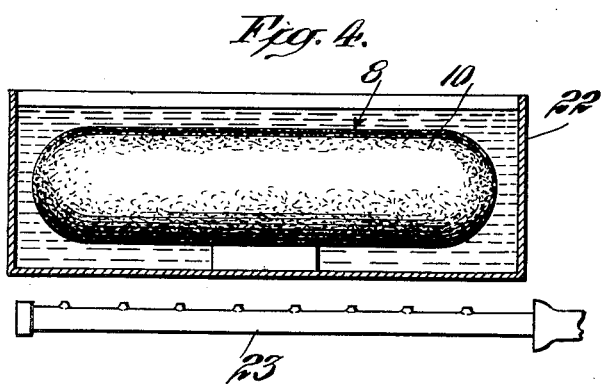
FREDERIC H. TABER
INVENTOR Patented Jan. 30, 1945

2,368,172

UNITED STATES PATENT OFFICE 2,368,172

APPARATUS FOR APPLYING WEARING SURFACE COATINGS TO TIRES

Frederic H. Taber, New Bedford, Mass.

Application December 18, 1942, Serial No. 469,746

1 Claim. (Cl. 91—53)

The invention herein described relates to the surfacing or resurfacing of the tread or wearing surfaces on vehicle tires.

The objects of the invention are to provide a tough resilient abrasive resistant coating or covering for the tread or road contact wearing surfaces of used or worn tires, which will combine with and become a unitary part of the tire structure and which will be economical, easily applied and practical in every way.

One of the more desirable objects and novel features accomplished by this invention is the simple and ready application of a surface coating to a worn tire so as to obtain additional usage and mileage and conserve strategic and critical rubber which would otherwise be required in the manufacture of new tires which normally replaced worn tires salvaged by this invention.

An additional desirable object is that the coating may be applied by unskilled labor and without the use of complicated or new equipment but rather is accomplished by the use of readily obtained equipment principally made from wood and fashioned by unskilled labor with the use of ordinary tools.

Heretofore it has been customary to recap used tires by scraping and re-grooving and otherwise evening the used tire surface by a long tedious process and through the use of heavy equipment. Once the surface has been dressed to receive the resurfacing a heavy strip of rubber is wrapped around the tire and the whole tire is inflated by use of an air bag and the entire assembly is put into a watch case mold. At the present time plantation rubber for this use is critical and the amount of available equipment and experienced men is distinctly limited so that a method for resurfacing tires quickly by inexperienced labor with machines which can be readily constructed, is mose desirable. This invention accomplishes these purposes.

The drawing accompanying and forming part of the specification illustrates certain practical details of the invention, but it will be understood that the invention is not restricted to these particular details, and that structure may be modified and changed, all within the true intent and broad scope of the invention as hereinafter defined and claimed.

Fig. 1 is a broken side and part sectional view illustrating a form of apparatus for applying the coating material to a tire.

Fig. 2 is a top plan view showing particularly features of the adjustable template governing thickness of the applied layer.

Fig. 3 is a broken sectional view illustrating a form of the drying chamber.

Fig. 4 is a broken sectional view of a form of hot water tank for effecting the final curing of the coating material.

The above drawing and description are purely illustrative of a device or manner in which a gasoline service station or other commercial servicing agency could inexpensively set themselves up so as to rapidly apply the coating surface to used tires. More perfect distribution is obtainable if the wheel is set in motion once the coating has been applied so as to hold the knife surface acutely against the coated surface in which circumstances the turning wheel will aid greatly in giving a smooth uniform surface. In many instances, however, even roughly applied coatings have certain advantages in that they might possibly give better traction if they are not finished too smoothly.

The constituents of the tread forming coating may vary with supplies available in our national economy and would be related to the ready obtainment of what is usually considered low grade, off-grade or wild resin rubbers such as guayule, cryptostegia grandiflora and others compounded according to best available art but in any circumstances containing accelerators, anti-oxidants and sulphur. This invention takes advantage of the fact that these wild rubbers with their high resin content make compounds which are soluble in small amounts of available low boiling point naphthas so as to form heavy doughs or putty-like cements which are free from nerve and which are readily applied by spreading with a wooden template over the wearing surface area of a tire. Illustrative of a suitable compound possessing excellent wearing qualities is as follows:

| | Pounds |
|---|---|
| Guayule | 4.25 |
| Zinc oxide | 0.13 |
| Carbon black | 0.75 |
| Phenyl-bata naphthylamine | 0.04 |
| Sulphur | 0.15 |

These materials are milled together and then churned with sufficient naphtha having a boiling temperature range of 150° F.—250° F. so as to make a dispersed solution of one gallon. The above highly viscous dough-like cement is capable of long time storage without deterioration or without appreciable change but is not as yet ready for application to the tire. There should accompany the cement a measured supply of the ultra-accelerator. For one gallon of the illustrated cement it is necessary to add an ultra-accelerator or fast curing agent of the dithiocarbamate type, such as butyl 8, 0.38 lb., just before applying to the tire. In the event that the cement is not to be used promptly it is possible to make the cement with all of the ingredients with the exception of the butyl 8 which may be mixed in by stirring by hand at any time just prior to use of the cement in the coating of the used tire. Such procedure allows the cement to be made in a commercial establishment at any time and to be used at service stations or the user's own garage at any future time.

The only preparatory treatment of the tire before coating is to establish that it is free from dirt, gum, resins, tar or other types of surface accumulations and these invariably are removed simply by washing the surface areas which are to be coated with gasoline or naphtha solvent. It is not necessary to abrade the tire or to remove any of its rubber or to even its surface in any way. Areas having excessive wear caused by unsatisfactory alignment, improper balancing or other faults common to tires need not receive special attention as such areas are ordinarily filled with the coating compound over these spots where excessive wear has previously occurred.

One quick and easy method of applying the coating is to rotate the tire in close proximity to a holder shaped to confine a thin layer of the medium against the face of the tire tread.

In Figs. 1 and 2, such holding and confining means is shown in the form of an inclined tray 5, having flanged edges 6, for confining a body of the cementitious material 7, against the tread portion of the tire 8, said tray having its edge concaved at 9, to closely approximate the tire contour and thus act as a gage to define and limit the thickness of the applied layer or layers 10.

To enable setting this device as an accurate template, the tray 5, is shown as supported and carried by a block 11, sliding in a guide slot 12, said block riding a screw 13, which can be turned by handle 14, to advance the tray toward or withdraw it away from the tire.

The tire may be conveniently handled by leaving it on the wheel 15, and by mounting the wheel temporarily on a supporting shaft 16, journalled in suitable bearings 17, and having a hand crank or other means 18, for turning it.

The tire casing alone may also be coated by being placed on a form fastened to the end of the shaft 16. The casing is then revolved and the same procedure followed as if the tire were mounted on an ordinary automobile wheel and fastened on the shaft as above described.

An amount of the material in excess of that actually required for the full coating may be placed in the tray, so that as the tire is rotated, the material will be worked onto the tire with a rolling, squeezing and kneading action. The thickness of the layer or layers can be determined by adjustment of the hand screw. The tire may be turned a number of times after the desired thickness of coating has been applied, to assure a firm and uniform smoothing of the coating in place, if necessary.

It is contemplated that the solution may be warmed as by setting a can of the cement in warm water or otherwise heating to reduce the viscosity, thus to enable use of a cement of higher viscosity than would otherwise be possible.

As particularly shown in Fig. 2, the flanged side edges of the template may closely approximate and actually engage both the sidewalls of the tire so as to taper the coating down to a feather edge at the opposite sides of the tire shoulders.

After application of the desired full thickness of wearing material, the solvent in the material is evaporated by drying. This drying may be simply by exposure to the air but to expedite the operation, heat may be applied at relatively low temperature, such as around 90° F. In or during this drying stage, it is possible to mold the solidifying coating medium into a non-skid or other desired traction surface.

Fig. 3 illustrates an example of drying chamber 19, in which the tire is removably supported at 20, while a heating agent such as hot air is circulated as by inflow and outflow pipes 24, 21.

The solvent evaporating or drying step, at the mild temperature mentioned, may be accomplished in from three to four hours' time.

When sufficiently dry, though possibly yet somewhat tacky, the tires may be immersed in water at a temperature of from about 180° F. to 190° F. for a time which may vary from one to two hours. With higher temperature this curing and vulcanizing time may be reduced.

In Fig. 4, a suitable hot water immersion tank is illustrated at 22, heated by a gas burner 23.

Hot air, steam or other heating medium may be employed, but the hot water method illustrated, provides a simple and satisfactory way of solidifying and permanently unifying and toughening the coating within a reasonable time and with freedom from all complicated or expensive apparatus. The actual time required will depend largely on the thickness of the applied coating.

The rubber in curing changes its character from a soft putty-like consistency to a firm resilient rubbery character.

After removal from the vulcanizing water bath the resurfaced tire is ready for use as soon as cooled and the cooling may require only a short time.

The guayule rubber is preferred because of its characteristically great adhesiveness, stickiness and tenacity. Compounded and treated as described, the applied layer is in effect bonded to the tire body and to such an extent that it will wear right down to the original surface. The applied layer may be $\frac{1}{16}$ of an inch or more or less in thickness. By suitable molds, any desired non-skid or other surface conformation may be impressed on the covering material after or during the drying period, that is, after the surface material has begun to harden and has lost some or all of its tackiness. It is contemplated that the applying of adhesive, by means of spreading the dough-like adhesive outlined above, to cracked abused or worn side walls as well as to the tread surface is within the meaning, intent and scope of this invention.

What is claimed is:

Apparatus for applying a tread forming coating to and incorporating it with a tire, said apparatus comprising a shaft journalled for rotation on a substantially horizontal axis, means for supporting a tire in concentric relation on said shaft, a stationary template at one side of said shaft extending from a position outside the periphery of the tire inwardly toward the center of the tire, said template having a concave edge portion disposed toward and embracing the peripheral portion of the tire and having side portions reaching inwardly about the sidewalls of the tire, means for setting said template with the concave inner edge and side portions of the same defining a narrow crescent shaped crevice about the crown and sidewall portions of the tire and to support a body of sticky, cohesive, elastic, tire tread forming material of dough-like consistency in direct engagement with the periphery and sidewall portions of the tire, and means for turning said shaft to rotate said tire toward the mass of sticky tread forming material supported by said template to thereby wedge and squeeze said material toward the tire and to drag said material in pressure-applying engagement through said crescent shaped crevice onto the tread and about the sidewall shoulders of the tire.

FREDERIC H. TABER.